United States Patent [19]

Kohl

[11] 4,146,354

[45] Mar. 27, 1979

[54] APPARATUS FOR SPREADING A STREAM OF PARTICLES

[75] Inventor: Lou Kohl, Palatine, Ill.

[73] Assignee: American Can Company, Greenwich, Conn.

[21] Appl. No.: 848,230

[22] Filed: Nov. 3, 1977

[51] Int. Cl.[2] .......... B29C 3/04

[52] U.S. Cl. .......... 425/79; 425/224; 425/363; 425/466; 425/471

[58] Field of Search .......... 334/7; 200/159 R, 340; 74/10 R; 264/175, 212, 216; 15/92 R, 97 R, 236 A; 425/363, 801, 471, 223, 381, 466, 79, 224, 201, 220, DIG. 235; 165/91; 241/199.12

[56] References Cited

U.S. PATENT DOCUMENTS

| | | | |
|---|---|---|---|
| 2,404,582 | 7/1946 | Bosomworth | 425/224 |
| 2,882,554 | 4/1959 | Heck | 425/79 |
| 3,233,837 | 2/1966 | Haber et al. | 241/199.12 |

*Primary Examiner*—Roy Lake
*Assistant Examiner*—Mark Rosenbaum
*Attorney, Agent, or Firm*—Robert P. Auber; Ira S. Dorman; Stuart S. Bowie

[57] ABSTRACT

An apparatus for spreading a stream of particles onto a moving carrier. Uses a chute for containing and delivering particles; a screed bar, movable relative to the moving carrier to control the thickness of a layer of particles delivered from the chute to the carrier; and a pair of rotatable cylindrical doctor blades, substantially coaxial with each other and positioned at opposing ends of the screed bar to control the thickness of a layer of particles delivered from the chute to the carrier at opposing ends of the screed bar. The screed bar and the two doctor blades together control the thickness of the center and the two sides of a continuous stream of powder. Preferably the carrier is the bottom roller of a pair of compaction rollers which receive the stream of powder and compact it preparatory to sintering.

13 Claims, 5 Drawing Figures

FIG. 1
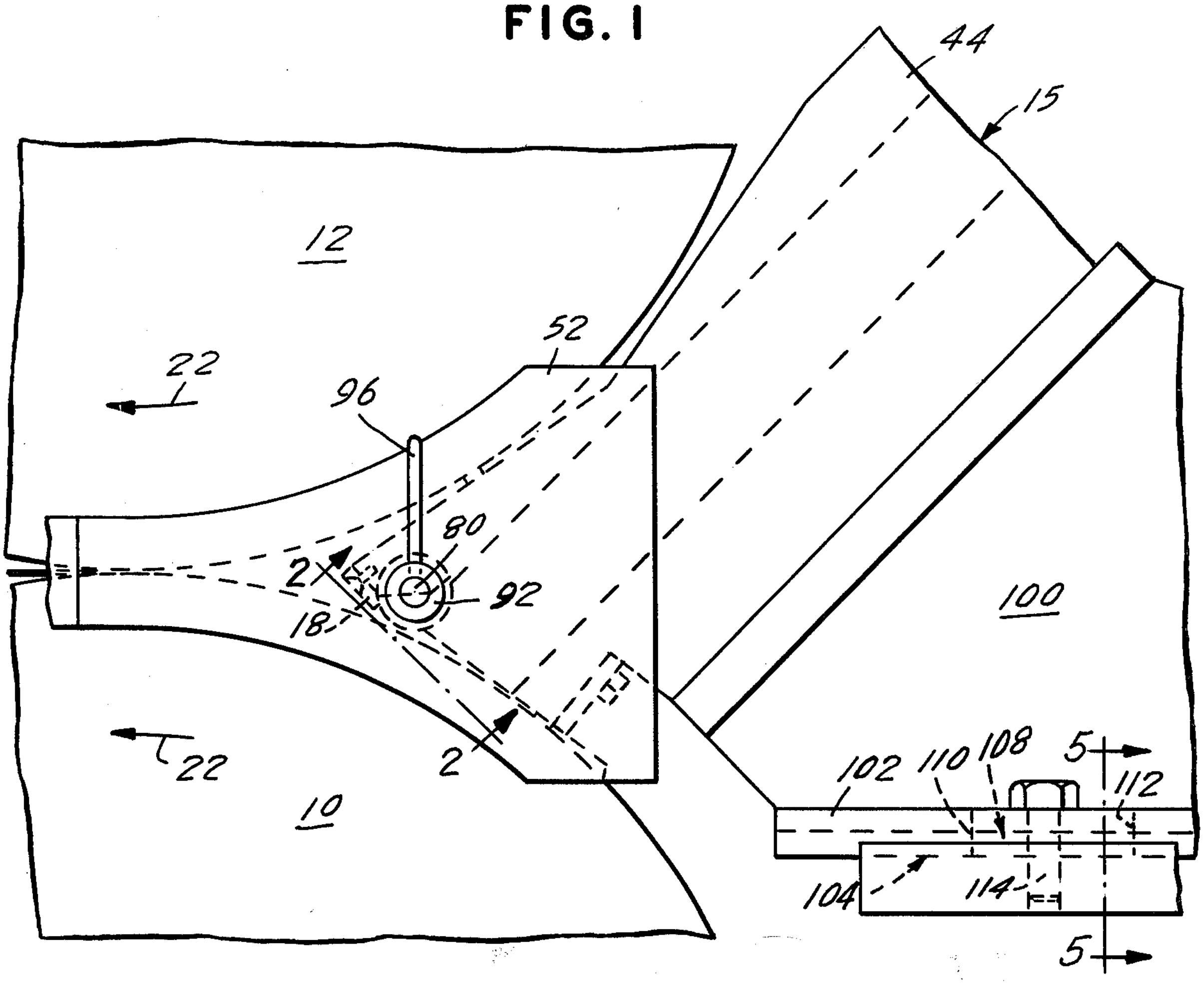
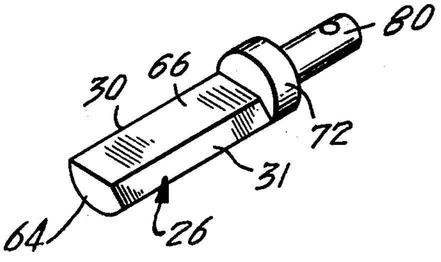
FIG. 4
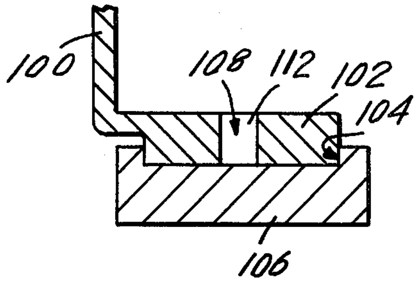
FIG. 5

APPARATUS FOR SPREADING A STREAM OF PARTICLES

BACKGROUND OF THE INVENTION

To make a continuous strip of metal from metallic particles, a continuous stream of particles needs to be delivered to compaction rolls which compact it into a compacted strip which is then delivered to a sintering furnace, heated, and delivered to hot rolls or delivered relatively cold to cold rolls to produce a continuous strip of dense metal.

The particles in the stream of powder delivered to the compaction rolls need to be spread so that the stream of particles is substantially in the shape of a continuous strip of particles. Such a stream of particles is called herein a strip of particles. The loose particles are supported by the carrier.

Formerly the particles were delivered from a chute or carrier belt into the nip of the compaction rolls. When they were delivered from a chute, a single screed bar controlled the thickness of the particles spread onto the carrier or the lower roll of the compaction rolls.

During the hot rolling step, or even during the compacting step, cracks frequently occurred in the edges of the strip. One cause of the cracks was improper distribution of powder across the width of the compacting rolls. During reduction of thickness of the strip, for example by hot rolling, the strip elongated and the thickness was reduced. When one region of the strip had less mass than another, the region of lower mass could not elongate as much as the region of higher mass, and tensile stresses were produced in the lower mass region producing cracks.

A typical feeder for delivering metal particles into the nip of the compaction rolls controls the rate of powder feed by adjusting a round metering bar. The metering bar has a slot in it which is cut out in such a way that turning the bar opens or closes the slot allowing more or less powder to flow into the roll nip.

BRIEF DESCRIPTION OF THE INVENTION

The apparatus contemplated by this invention is a volumetric metering feeder which adjustably delivers controlled mass to the edges of the train or strip of particles. The amount of delivered mass per unit length of strip depends upon the rolling speed of the compaction rolls.

A screed bar is adjusted toward and away from the nip of the compaction rolls and from the surface of the lower compaction roll to control the thickness of the center of the spread train of particles delivered to the compaction rolls. On each end of the metering or screed bar are independently adjustable doctor blades which independently control the thickness and mass distribution of the powder train at the edges of the powder train.

Each variable doctor blade of this invention comprises a rotatable member which forms a doctor blade wherein rotation of the member varies the height of the delivered particle flow. In a preferred embodiment, each doctor blade is on a chord plane of a cylinder. Turning the cylinders within limits about their major axes causes the thickness and mass rate of the flow of particles at the edge of the strip to be increased or decreased.

In practice, the screed bar and the two adjustable doctor blades are first adjusted to produce a reasonably uniform mass distribution across the width of the strip of particles delivered to the compaction rolls. Typically an X-ray thickness gauge of the compacted strip tells the operator when a substantially uniform mass distribution occurs.

Usually the compacted strip is fed continuously from the compaction rolls through a sintering and heating furnace into a hot mill. As the compacted and sintered strip is further reduced in thickness in the hot mill rolls, edge cracks may occur. The edge cracks are minimized or eliminated by opening the doctor blades upstream at the edges of the strip of particles fed to the compaction rolls. If too much powder is fed to the edges, as evidenced by center cracks or edge buckle of the hot rolled metal, the powder flow to the edges may be reduced by turning the doctor blades in the other direction.

It is therefore an object of this invention to control the mass flow of particles to the edges of a continuously flowing and moving strip of particles.

It is another object of this invention to minimize or eliminate cracks and edge buckling of milled metal strip which is made from compacted and sintered metal particles.

BRIEF DESCRIPTION OF THE DRAWINGS

Other objects will become apparent from the following description, taken in connection with the accompanying drawings in which:

FIG. 1 is an outside end view of the apparatus of this invention installed adjacent a pair of compaction rolls;

FIG. 4 is an oblique view of a single doctor blade of this invention; and

FIG. 5 is a sectional view taken at 5—5 in FIG. 1.

DETAILED DESCRIPTION OF THE INVENTION

The apparatus of this invention is used to distribute metal particles onto a metal particle carrier. More particularly, the apparatus of this invention is used to deliver and spread a stream of metal particles onto the lower roll of a pair of compaction rolls. The spread stream or strip of loose metal particles is compacted in the compaction rolls to produce a strip of compacted particles which then are sintered to form a sintered strip. The sintered strip then typically is delivered to a hot or cold rolling mill for compression into a high density metal strip.

Figure 2:
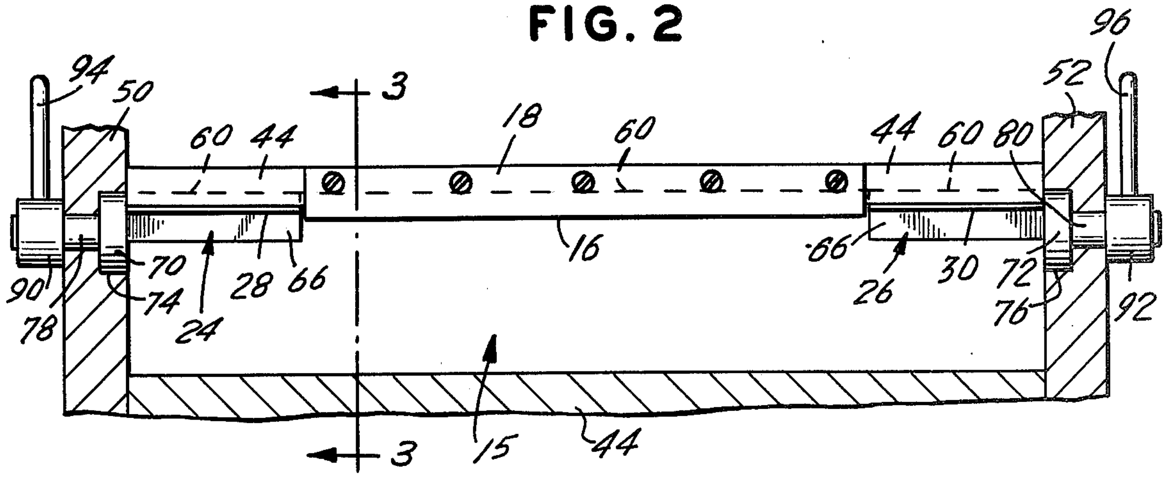
FIG. 2 is a view, partly in section, taken at 2—2 in FIG. 1, showing the center screed bar and a pair of rotatable doctor blades in accordance with this invention.

In FIG. 1 is shown an end view of a pair of compaction rolls including a lower compaction roll 10 and an upper compaction roll 12, turning in the directions shown by arrows 22. Metal particles 14 are delivered through a chute 15 shown in FIGS. 2 and 3. Alternatively they may be delivered by other carrier means such as, for example, a continuous belt (not shown). The particles are delivered from the lower end of the chute 15 onto the lower compaction roll 10.

The height and mass distribution of the deposited layer of matal particles in the center of the strip is determined by the height of the bottom edge 16 of the screed bar 18. (See FIGS. 2 and 3). Because of the curvature of the surface of the bottom roll 10, moving the screed bar 18 toward and away from the nip 20 of the rolls 10 and 12 varies the height of the bottom edge 16 relative to the surface of the bottom roll 10.

On both ends of the screed bar 18 are doctor blades 24 and 26. The doctor blades 24 (blade 26 is shown in perspective in FIG. 4) and 26 are each independently adjustable, and the heights of the bottom edges 28 and 30 of the doctor blades 24 and 26 determine the thickness and mass distribution of the layer of delivered particles on the two edges of the delivered strip of particles.

A spring-biased magnet 42, attached to the frame 44 of the chute 15 adjacent the roller 10 extends as a fence across and is in contact with the surface of the rollers 10 to prevent random escape of the metal particles. Fences 50 and 52 prevent escape of the particles off the end of the rolls 10 and 12. A non-magnetic fence 40 forms a barrier between the surface of the roll 12 and the frame 44 to limit the introduction of outside oxidizing air into the roll nip 20.

Figure 3:
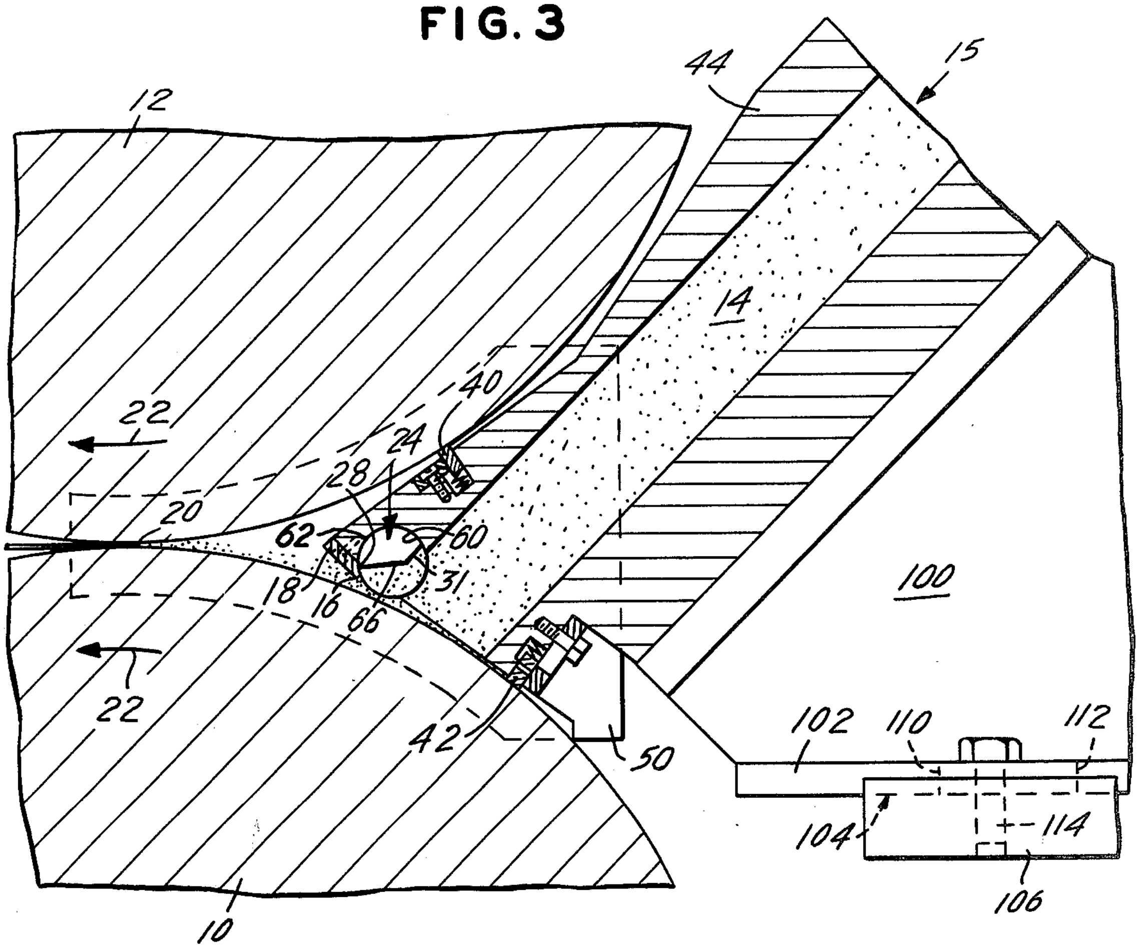
FIG. 3 is a sectional view, taken at 3—3 in FIG. 2, of the apparatus of this invention positioned for operation with a pair of compaction rolls.

The doctor blades 24 and 26 are substantially identical. A cylindrical groove 60 and the outer surfaces 62 and 64 of the doctor blades 24 and 26 are cylindrically shaped with substantially the same curvature as the groove 60 to fit into the groove 60 and to rotate therein. That is, the groove 60 acts as a bearing for the doctor blades 24 and 26. The surfaces of the doctor blades 24 and 26, such as surface 66 in FIGS. 2–4, preferably are on a chordal plane of the cylinder defined by the surfaces 62 and 64. Even more preferably, the surfaces such as surface 66 are defined by a diametral plane of the cylinder. The unused edge 31 of the surface 66 is preferably relieved as shown in FIG. 3, wherein the trailing edge of the planar surface 66 is blunted. The doctor blades 24 and 26 have substantially coaxial axes of rotation, and they are preferably defined along the center of the cylinders of the surfaces 62 and 64. Rotation of the doctor blades 24 or 26 causes the edges 28 and 30 of the surfaces to vary in height above the surface of the carrier 10 and to limit or meter the flow of particles into the strip.

Although the doctor blades 24 and 26 may be rotatable about their axes of rotation upon bearings of various kinds, one preferred kind of bearing, in addition to bearing 60, are the full cylindrical bearings 70 and 72 which fit into the frame 50 and 52 at bearing surfaces 74 and 76. Shafts 78 and 80 which, in turn, are connected to the collars 90, 92 and handles 94, 96 are also in journal bearings in the end frames 50, 52, and they are used to turn and adjust the doctor blades 24, 26. In a preferred embodiment, each of the doctor blades 24, 26, and its corresponding journal bearings 70, 72, and corresponding shafts 78 and 80 are made in one piece (as shown in FIG. 4) which may be inserted into the respective openings 74 and 76 as well as into the sleevelike groove or bearing 60.

The frame 44, including the end frames 50, 52, is mounted to slide with the frame 100 right and left (in FIGS. 1 and 3) moving the screed bar 18 toward and away from the nip 20 and the edge 16 closer to and farther away from the surface of roll 10.

As shown in FIGS. 1 and 5, the frame 100 has a slide 102 on its lower edge. The slide 102 fits into a channel 104 in a fixed base 106. The slide 102 has a slot 108 therein with end stops 110, 112. A bolt 114 fits through the slot 108 into the base 106. The frame 100, and all it carries, may be moved right and left between limits defined by the bolt 114 and the ends 110, 112 of the slot 108. The bolt 114 locks the frame 100 in place on the base 106.

In operation, the doctor blades 24 and 26 are set at some nominal position above the surface of roller 10 which may or may not be at the same height as the screed bar 18. The strip of particles is compacted and sintered. It may optionally be X-Rayed to determine mass distribution. The sintered material is then delivered to either a hot or a cold mill. Typically, cracks will be discerned either at the margins of the rolled strip or at the center of the strip, and correction of the mass flow of particles by rotating one or both of the doctor blades 24 and 26 or by moving the screed bar 16 toward or away from the nip of the rollers may be made.

As the handles 94, 96 are turned in one direction, the edges 28, 30 of the particular doctor blades 24, 26 are lifted allowing a larger mass flow rate to be delivered to the carrier surface of the roll 10 and into the nip 20 of the rollers 10 and 12. Turning the handles 94, 96 in the other direction lowers the edges 28, 30 to decrease the mass flows of particles at ends of the roller nip 20.

In summary, the invention is a means 44 forming a chute 15 for containing particles. A screed bar 18 is positioned on one side of the bottom of the chute 15 to control the thickness of a layer of particles delivered from the chute 15. A pair of adjustable doctor blades 24 and 26 are positioned at opposing ends of the screed bar 18 to control the thickness of the edges of a layer of particles delivered from the chute 15. Each of the doctor blades 24 and 26 is shaped as a segment of a circular cylinder which is confined between the cylinder surface 62 or 64 and a chordal plane 66. The chordal planar surface 66 has a leading edge 28 or 30 and a trailing edge which is relieved in the shape of a second chordal surface 31 at an angle to the surface 66.

A bearing means 60 has a circularly cylindrical surface whose radius is the same as the cylindrical surface 62 or 64, and it is positioned to hold the doctor blades 24, 26 in coaxial relation.

Thrust and journal bearings are positioned at 74 and 76, and each of the doctor blades has fully cylindrical shafts 70, 72 on one end thereof matching the thrust and journal bearings. Stub shafts 78, 80 are attached coaxially to members 70, 72.

The bottom roll 10 is a carrier for carrying particles away from the chute 15.

Thus, the apparatus of this invention is usable to control the distribution of particles delivered from the chute 15 into the nip 20 of the compacting rolls 10, 12, thereby increasing the quality of the strip produced by mills which roll the compacted strip.

Although the invention has been described in detail above, it is not intended that the invention shall be limited by that description, but only by that description taken together with the accompanying claims.

I claim:

1. An apparatus for manufacturing a continuous strip of metal from metallic particles including upper and lower compaction rolls mounted in cooperative relationship to each other forming means for receiving said particles and compacting the same into a strip; and further including in combination:

(a) means forming a chute for containing and delivering particles, said means having a frame and an opening positioned adjacent said rolls for delivery of particles therethrough to said rolls;

(b) adjustable screed bar means positioned at said opening of said chute means to control the thickness of a layer of particles delivered from said chute; and (c) adjustable doctor blade means positioned at opposing ends of said screed bar means to control the thickness of the edges of the layer of particles delivered from said chute, said means being adjustable independently of said screed bar means.

2. The combination of claim 1 in which each of said doctor blades means is shaped as a segment of a circular cylinder confined between said cylinder and one of its chordal planes.

3. The combination of claim 2 in which said circular cylinders are of the same radius and coaxial.

4. The combination of claim 3 and further comprising bearing means having a circularly cylindrical surface whose radius is substantially the same as the cylindrical surface of said doctor blade means, positioned to hold said doctor blade means in coaxial relation.

5. The combination of claim 4 and further comprising thrust and journal bearings supported by the frame for the chute means for supporting said doctor blade means, and wherein each of said doctor blade means has fully cylindrical shafts on one end thereof matching said thrust and journal bearings.

6. The combination of claim 5 and further comprising handles on each shaft for independently adjusting said doctor blade means.

7. The combination of claim 6 wherein each of said doctor blade means has a leading blade edge and a trailing edge of said chordal plane and wherein said trailing edge is relieved to avoid interference by said trailing edge with the flow of particles.

8. The combination of claim 7 wherein a compaction roll comprises a carrier means adjacent the bottom of said chute for carrying particles away from said chute.

9. The combination of claim 8 and further comprising means operatively associated with said screed bar means for moving said screed bar means toward and away from said carrier means.

10. The combination of claim 9 wherein said carrier means is a lower roll.

11. The combination of claim 1 wherein said doctor blade means comprises:

(a) a first rigid member shaped as a segment of a cylinder confined between said cylinder and one of its chordal planes;

(b) a second rigid cylindrical member having substantially the same radius as the cylinder of said first member, and attached coaxially to one end of said first member; and (c) a cylindrical stub shaft having a smaller radius than said first and second members, attached coaxially to said second member on the side opposite said first member.

12. The combination of claim 11 wherein said chordal surface of said first member has a leading blade edge and a trailing relieved edge.

13. The combination of claim 12 wherein said trailing edge is relieved by further confining said first member within a second chordal plane at an angle to said first chordal plane.

* * * * *